(No Model.)
W. FAWCETT
HAME TUG.
No. 283,475. Patented Aug. 21, 1883.
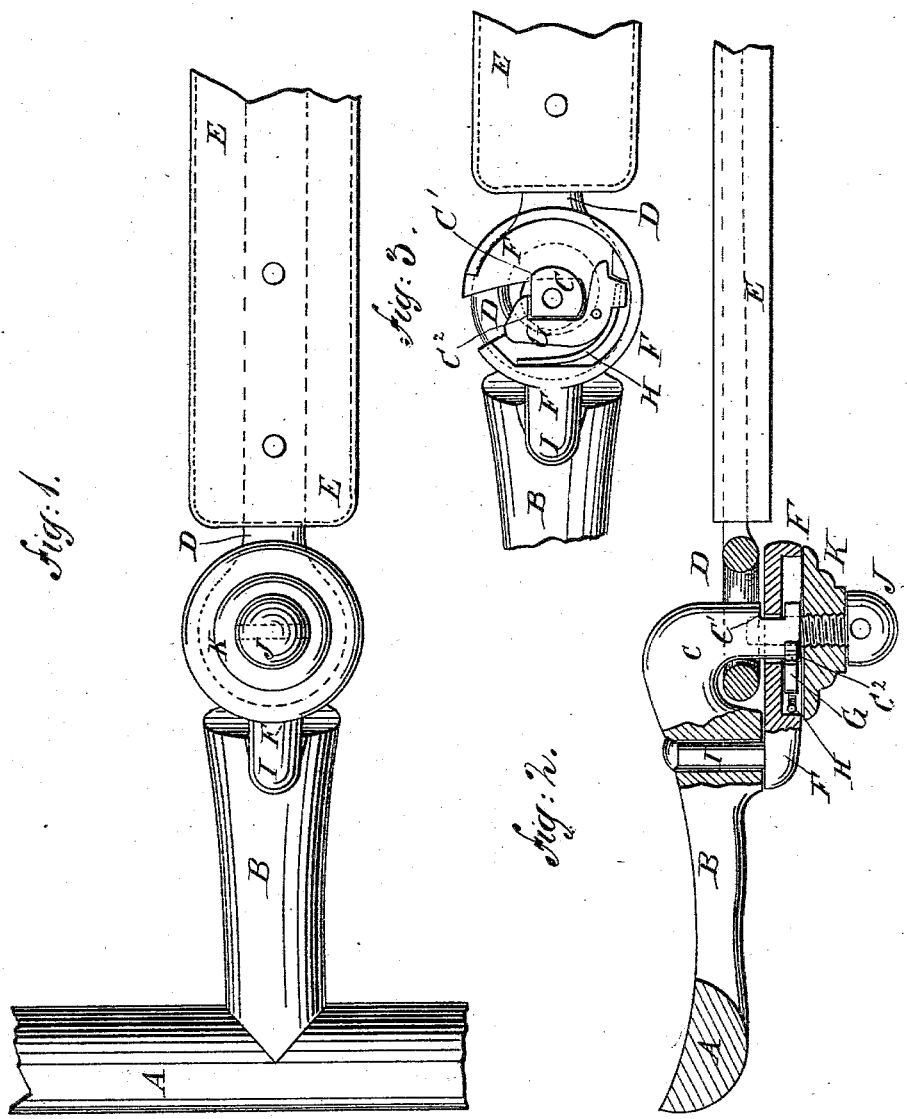
WITNESSES:
Chas. Nida.
C. Sedgwick
INVENTOR:
W. Fawcett
BY
ATTORNEYS.

UNITED STATES PATENT OFFICE.

WILLIAM FAWCETT, OF NEW YORK, N. Y.

HAME-TUG.

SPECIFICATION forming part of Letters Patent No. 283,475, dated August 21, 1883.

Application filed December 29, 1882. (No model.)

*To all whom it may concern:*

Be it known that I, WILLIAM FAWCETT, of the city, county, and State of New York, have invented certain new and useful Improvements in Hame-Tug Connections, of which the following is a full, clear, and exact description.

Reference is to be had to the accompanying drawings, forming part of this specification, in which similar letters of reference indicate corresponding parts in all the figures.

Figure 1 is a front elevation of my invention. Fig. 2 is a plan view of the same, partly in section, and part being broken away. Fig. 3 is a front elevation of the same, the screw and top of the cap being removed.

The object of this invention is to allow hame-tugs to be readily attached to hames and detached therefrom, so that the hame-tugs can be made separate from the hames.

The invention consists in a hame-tug connection constructed with an outwardly-projecting hook upon the hame draft-arm, to receive and serve as a pivot to the hame-tug eye, and a swiveled fastening-hook provided with a spring-catch hook for securing the said hame-tug eye upon the said draft-hook. The swiveled hook is further secured in place upon the draft-hook by a screw passing through the said hook and into a screw-hole in the end of the said draft-hook, as will be hereinafter fully described.

A represents a hame, upon which is formed a draft-arm, B. Upon the outer end of the draft-arm B is formed a hook or pivot, C, projecting outward at right angles with the line of draft to receive the hame-tug eye D. The hame-tug eye may be made of metal and with its shank secured to the end of the hame-tug E by rivets or other suitable means; or the hame-tug eye can be a hole formed through the end of the hame-tug to receive the hook C. The hame-tug eye D is secured in place upon the draft-hook C by a hook, F, which has a curved slot formed in it narrower than the diameter of the hook C, so that the inner edge of the said hook F will enter a slot, C', in the side of the hook C, to prevent the hame-tug eye from coming off the draft-hook.

The hook F is secured in place upon the draft-hook C by a hook-latch, G, pivoted in a recess in the hook F, and held forward to engage with a square corner, $C^2$, formed upon the hook C, by a spring, H, attached to it, and resting against the side of the said recess. Upon one side of the hook F is formed, or to it is attached, a pivot, I, which passes through a hole in the arm or shank of the draft-hook C, and is secured in place by having its end headed down, or by other suitable means.

The hook F can be further secured in place by a screw, J, which passes through a hole in the cover of the said hook, and screws into a hole in the end of the draft-hook C.

The cover K of the hook F may be separate from the body of the said hook, or may be formed upon it, or secured to it by rivets or other suitable means.

With this construction the hame-tugs can be made without being connected with the hames, so that the harness can be finished and afterward connected with hames of such a size as the size of the horse upon which the harness is to be used may require.

Having thus described my invention, what I claim as new, and desire to secure by Letters Patent, is—

1. A hame-tug connection constructed substantially as herein shown and described, and consisting of a hook swiveled upon the hame draft-arm, and adapted to engage with the end of the hame draft-hook to close the same and hold the eye of the tug in place upon the hook, as set forth.

2. In a hame-tug connection, the combination, with the draft-hook C, of the swiveled hook F, substantially as herein shown and described.

3. In a hame-tug connection, the combination, with the draft-hook C and the swiveled hook F, of the hooked latch G and the spring H, substantially as herein shown and described, whereby the swiveled hook will be locked in place upon the draft-hook, as set forth.

4. In a hame-tug connection, the draft-hook C, made, substantially as herein shown and described, with a side slot, C', and a corner, $C^2$, at its end, to adapt it to engage with the swiveled hook, and the spring-catch to hold the said swiveled hook from outward movement, as set forth.

5. In a hame-tug connection, the combination, with the draft-hook C and the swiveled hook F, of the fastening-screw J, substantially as herein shown and described, whereby the said swiveled hook is secured in place upon the said draft-hook, as set forth.

WILLIAM FAWCETT.

Witnesses:
  JAMES T. GRAHAM,
  C. SEDGWICK.